(12) United States Patent
Chang et al.

(10) Patent No.: US 11,531,154 B2
(45) Date of Patent: Dec. 20, 2022

(54) BACKLIGHT MODULE AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Chia-Yin Chang, Kaohsiung (TW); Po-Chang Huang, Kaohsiung (TW); Kun-Cheng Lin, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/446,169

(22) Filed: Aug. 27, 2021

(65) Prior Publication Data

US 2022/0035093 A1 Feb. 3, 2022

Related U.S. Application Data

(63) Continuation of application No. PCT/CN2020/087478, filed on Apr. 28, 2020.

(51) Int. Cl.
*F21V 8/00* (2006.01)
*G02B 5/09* (2006.01)

(52) U.S. Cl.
CPC ............ *G02B 6/0055* (2013.01); *G02B 5/09* (2013.01)

(58) Field of Classification Search
CPC ...... G02B 6/0055; G02B 5/09; G02B 6/0036; G02B 6/002; G02B 6/0031; G02B 6/0025; G02B 6/003

USPC ......................................... 362/97.1, 600–630
See application file for complete search history.

(56) References Cited

U.S. PATENT DOCUMENTS

| 5,971,559 A | 10/1999 | Ishikawa et al. |
| 7,876,489 B2 | 1/2011 | Gandhi et al. |
| 10,495,879 B1 | 12/2019 | Ahuja et al. |
| 2006/0291238 A1* | 12/2006 | Epstein ............... G02B 5/0294 362/600 |

(Continued)

FOREIGN PATENT DOCUMENTS

| CN | 1444078 A | 9/2003 |
| CN | 1779518 A | 5/2006 |

(Continued)

*Primary Examiner* — Andrew J Coughlin
*Assistant Examiner* — Jessica M Apenteng
(74) *Attorney, Agent, or Firm* — CKC & Partners Co., LLC (57) ABSTRACT

A backlight module and a display device are provided. The backlight module includes an optical film and a light source. The optical film includes a main body and optical structures. The main body has a light-emitting surface, an optical surface, a first side surface and a second side surface. The optical structures are disposed on the main body. Each of optical structures has a first surface and a second surface. The first surface is inclined relative to the optical surface. A first angle is formed between the first surface and the optical surface. The second surface is inclined relative to the optical surface, and a second angle is formed between the second surface and the optical surface. The first angles and the second angles are acute angles, and the first angles of the optical structures vary along a first direction from the first side surface to the second side surface.

11 Claims, 8 Drawing Sheets

(56) References Cited

U.S. PATENT DOCUMENTS

| | | | | |
|---|---|---|---|---|
| 2011/0228387 A1* | 9/2011 | Shiau | .................. | G02B 6/0068 |
| | | | | 362/613 |
| 2013/0070477 A1* | 3/2013 | Yamada | ............... | G02B 6/0038 |
| | | | | 362/606 |
| 2018/0210243 A1* | 7/2018 | Fang | .................... | G02B 6/0038 |
| 2019/0004237 A1* | 1/2019 | Kitano | ................... | B32B 27/20 |
| 2019/0235150 A1* | 8/2019 | Hsu | ....................... | G02B 6/0088 |
| 2019/0302329 A1* | 10/2019 | Jin | ......................... | G02B 30/33 |
| 2020/0057188 A1* | 2/2020 | Zhang | ................. | G02B 6/0031 |

FOREIGN PATENT DOCUMENTS

| | | |
|---|---|---|
| CN | 108469642 A | 8/2018 |
| TW | M299304 U | 10/2006 |
| TW | M334359 U | 6/2008 |
| TW | 201337442 A | 9/2013 |
| TW | I683133 B | 1/2020 |

* cited by examiner

BACKLIGHT MODULE AND DISPLAY DEVICE

RELATED APPLICATIONS

This application is a continuation application of International Application No. PCT/CN2020/087478 filed on Apr. 28, 2020, which is incorporated herein by reference.

BACKGROUND

Field of Invention

The present invention relates to an optical film and its applications. More particularly, the present invention relates to an optical film and its applications to a backlight module and a display device.

Description of Related Art

Figure 1:
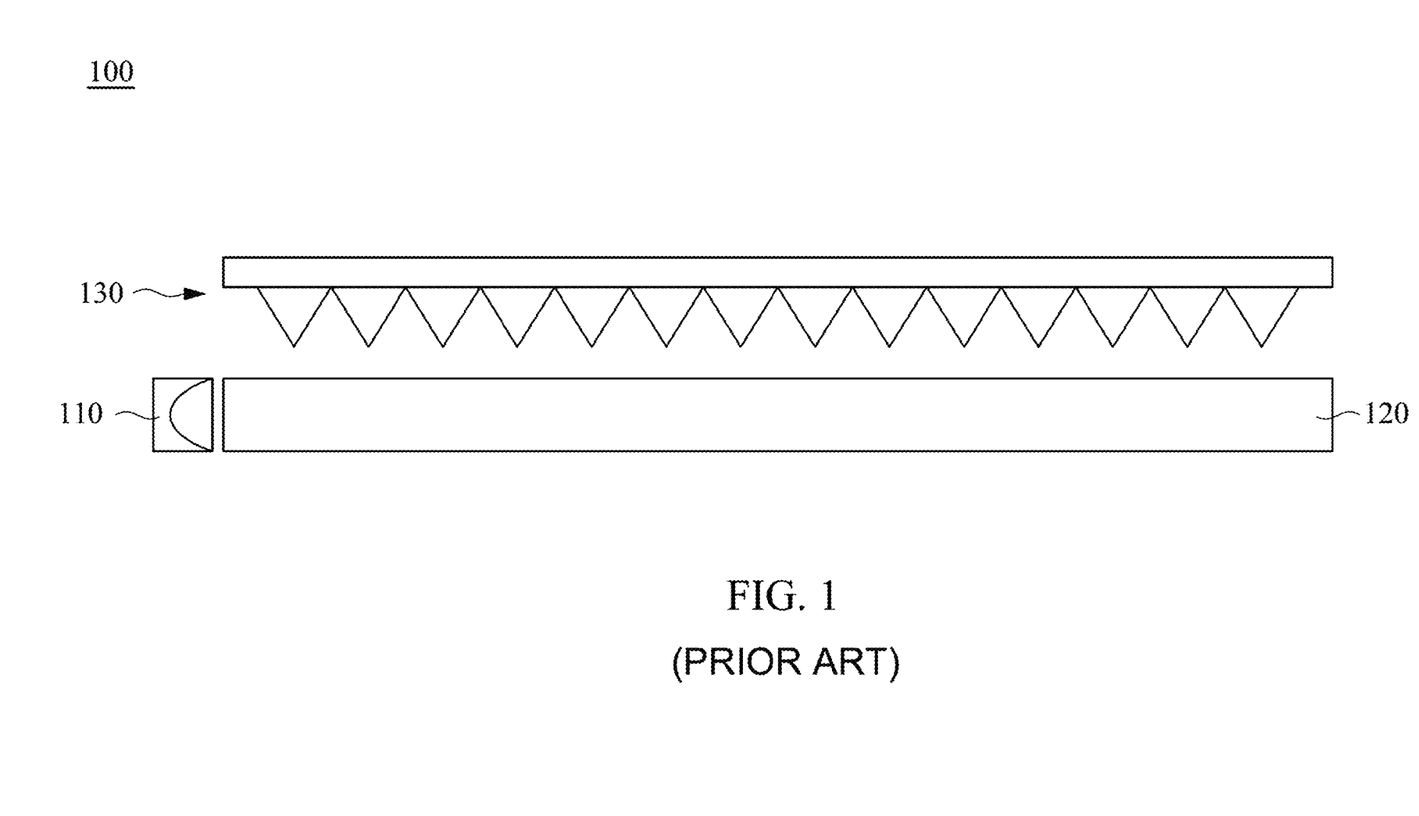
FIG. 1 is a schematic structural diagram showing a conventional backlight module.

Referring to FIG. 1, FIG. 1 is a schematic structural diagram showing a conventional backlight module 100. The conventional backlight module 100 includes a light source 110, a light guide plate 120 and a turning film 130. The light source 110 is disposed at a side of the light guide plate 120 and is used to provide a light beam to the light guide plate 120. The turning film 130 is disposed in front of the light guide plate 120 for directing the light beam from the light guide plate 120 to be emitted in a normal direction, such that after passing through the turning film 130, the light beam from the light guide plate 120 can be emitted outwards at an orthogonal viewing angle.

Although the turning Film 130 in the backlight module 100 may enable the backlight module 100 to produce a narrow viewing angle with high luminance effect, yet for the current automotive products, only those with larger display viewing angles may meet the viewing requirements of users viewing from left and right sides of front seats in a car; and for the near-eye display products with such as AR (Augmented Reality) or VR (virtual reality) display devices, only those with a larger display viewing angle may meet the requirements of near-field reaching distances. Apparently, conventional display devices with orthogonal viewing angles cannot meet various display requirements.

SUMMARY

An object of the invention is to provide an optical film which is applicable to a backlight module and a display device to generate different directions of view angles for the backlight module and the display device.

According to the aforementioned object, a backlight module is provided. The backlight module includes a light-guiding film, a light source and an optical film. The light-guiding film includes a light-incident surface and a light-emitting surface connected to the light-incident surface. The light source is disposed adjacent to the light-incident surface. The optical film is disposed adjacent to the light-incident surface and is configured to receive and guide a light beam. The optical film includes a main body and plural optical structures. The main body has a light-emitting surface, an optical surface, a first side surface and a second side surface, in which the light-emitting surface is opposite to the optical surface, and the first side surface and the second side surface are respectively connected to two opposite sides of the optical surface. The optical structures are disposed in a first area of the optical surface, in which the light beam is guided by the optical structures to emit out from the light-emitting surface. Each of the optical structures has a first surface and a second surface. The first surface is inclined relative to the optical surface, in which a first angle is formed between the first surface and the optical surface. The first surface is a light-receiving surface which is first contacted by the light beam coming from the light-guiding film 220 and entering the optical film. The second surface is connected to the first surface, in which the second surface is inclined relative to the optical surface, and a second angle is formed between the second surface and the optical surface. The first angles of the optical structures and the second angles of the optical structures are acute angles, and the first angles of the optical structures vary along a first direction from the first side surface to the second side surface.

According to an embodiment of the present invention, the optical film is a turning film. The optical surface further includes a second area, and the second area is also set with the optical structures, in which the first area and the second area are arranged along the first direction, and the first area is connected to the first side surface, and the second area is connected to the second side surface. The first angles of the optical structures located in the first area and the second area become greater along the first direction. The optical structures disposed in the first area and the optical structures disposed in the second area are symmetrical in shape about a boundary line between the first area and the second area.

According to an embodiment of the present invention, the optical film faces towards the light guide film and is not separated from other components. After passing through the light-guiding film and emitting outwards from the light-emitting surface of the light-guiding film, the light beam provided by the light source enters the optical film from the first surfaces of the optical structures and is reflected by the second surfaces to emit out of the optical film from the light-emitting surface.

According to an embodiment of the present invention, the optical structures are arranged along the first direction, and each of the optical structures is a stripe structure which extends along a second direction, and the second direction is perpendicular to the first direction.

According to the aforementioned object, another backlight module is provided. The backlight module includes an optical film, a light source and a turning film. The optical film is a light-guiding film and includes a main body and plural optical structures. The main body has a light-emitting surface, an optical surface, a first side surface and a second side surface, in which the light-emitting surface is opposite to the optical surface, and the first side surface and the second side surface are respectively connected to two opposite sides of the optical surface. The optical structures are disposed in a first area of the optical surface, in which the light beam is guided by the optical structures to emit out from the light-emitting surface. Each of the optical structures has a first surface and a second surface. The first surface is inclined relative to the optical surface, in which a first angle is formed between the first surface and the optical surface. The first surface is a light-receiving surface which is first contacted by the light beam entering the optical film. The second surface is connected to the first surface, in which the second surface is inclined relative to the optical surface, and a second angle is formed between the second surface and the optical surface. The first angles of the optical structures and the second angles of the optical structures are acute angles, and the first angles of the optical structures vary along a first direction from the first side surface to the second side surface. The first area extends from the first side surface to the second side surface. The first angles of the optical structures located in the first area become greater along the first direction. The light source is disposed adjacent to the first side surface of the optical film. The turning film disposed on the optical film.

According to an embodiment of the present invention, the turning film faces towards the light guide film and is not separated from other components. The turning film has a plurality of prism structures, and each of the prism structures has a deflecting surface and a reflecting surface. The light beam provided by the light source enters the optical film from the first side surface, and the light beam entering the optical film is further reflected by first surfaces of the optical structures to emit out of the optical film from the light-emitting surface and enter the turning film from the deflecting surfaces of the turning film, and the light entering the turning film is further reflected by the reflecting surfaces of the turning film to be emit out of the turning film.

According to an embodiment of the present invention, a size or a height of each of the optical structures increases with increased distance between the optical structures and the first side surface.

According to an embodiment of the present invention, a spacing between any two adjacent optical structures decreases with increased distance between the any two adjacent optical structures and the first side surface.

According to an embodiment of the present invention, the optical structures are arranged along the first direction, and each of the optical structures is a stripe structure which extends along a second direction, and the second direction is perpendicular to the first direction.

According to the aforementioned object, a display device is provided. The display device includes the aforementioned backlight module and a display panel. The light source is configured to provide the light beam to the optical film. The display panel is disposed in front of the backlight module.

It can be known from the above that the present invention advantageously employs the optical film on which the optical structures having light-receiving surfaces with gradually varying inclinations are disposed to redirect the light beam generated by the light source after passing through the optical film, thereby generating different viewing angles. Thus, the optical film of the present invention is suitable for use in products such as car automobile display devices, or AR/VR display devices. In other words, through the optical film of the present invention, the viewing range of the backlight module can be increased, thereby fully meeting the requirements of different viewing directions from front seats in a car, or near-field reaching distances of AR/VR display devices, thereby satisfying the requirements of various products.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 2:
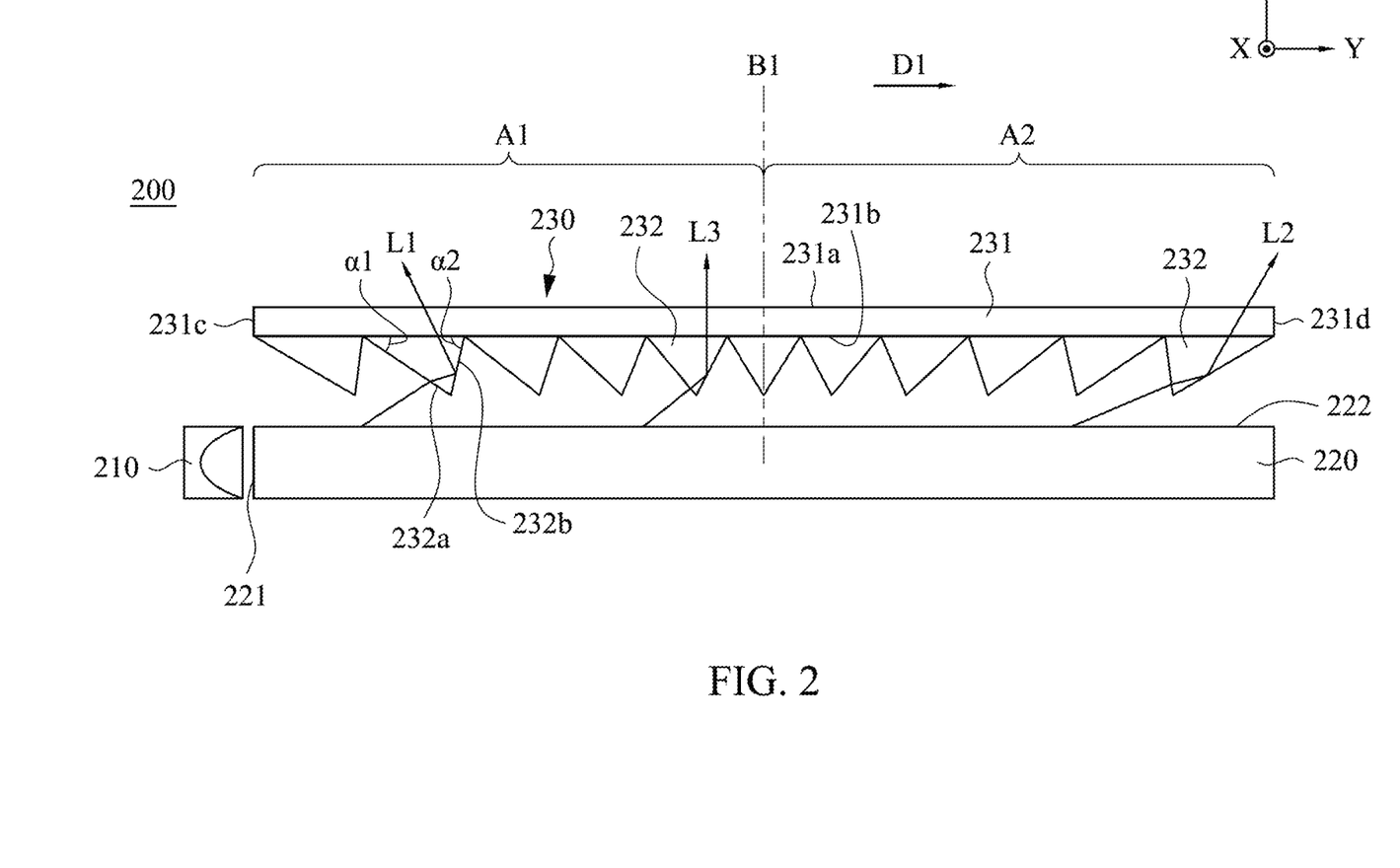
FIG. 2 is a schematic structural diagram showing a backlight module in accordance with a first embodiment of the present invention.

Referring to FIG. 2, FIG. 2 is a schematic structural diagram showing a backlight module 200 in accordance with a first embodiment of the present invention. The backlight module 200 of the present embodiment includes a light source 210, a light-guiding film 220 and an optical film 230. The light-guiding film 220 includes a light-incident surface 221 and a light-emitting surface 222 which is connected to the light-incident surface 221. The light source 210 is disposed adjacent to the light-incident surface 221 to provide light beam to the light-guiding film 220. The optical film 230 is disposed on the light-emitting surface 222 of the light-guiding film 220 to redirect the light beam from the light-guiding film 220 to be emitted in different directions. In one embodiment, the optical film 230 is a turning film.

As shown in FIG. 2, the optical film 230 includes a main body 231 and plural optical structures 232. The main body 231 has a light-emitting surface 231a, an optical surface 231b, a first side surface 231c and a second side surface 231d. The light-emitting surface 231a is opposite to the optical surface 231b, and the first side surface 231c and the second side surface 231d are respectively connected to two opposite side edges of the optical surface 231b. The optical structures 232 are disposed on the optical surface 231b of the main body 231. Therefore, after the light beam is emitted from the light-guiding film 220 and enters the optical film 230, the optical structures 232 of the optical film 230 can guide the light beam to emit out of the optical film 230 from the light-emitting surface 231a.

Figure 3A:
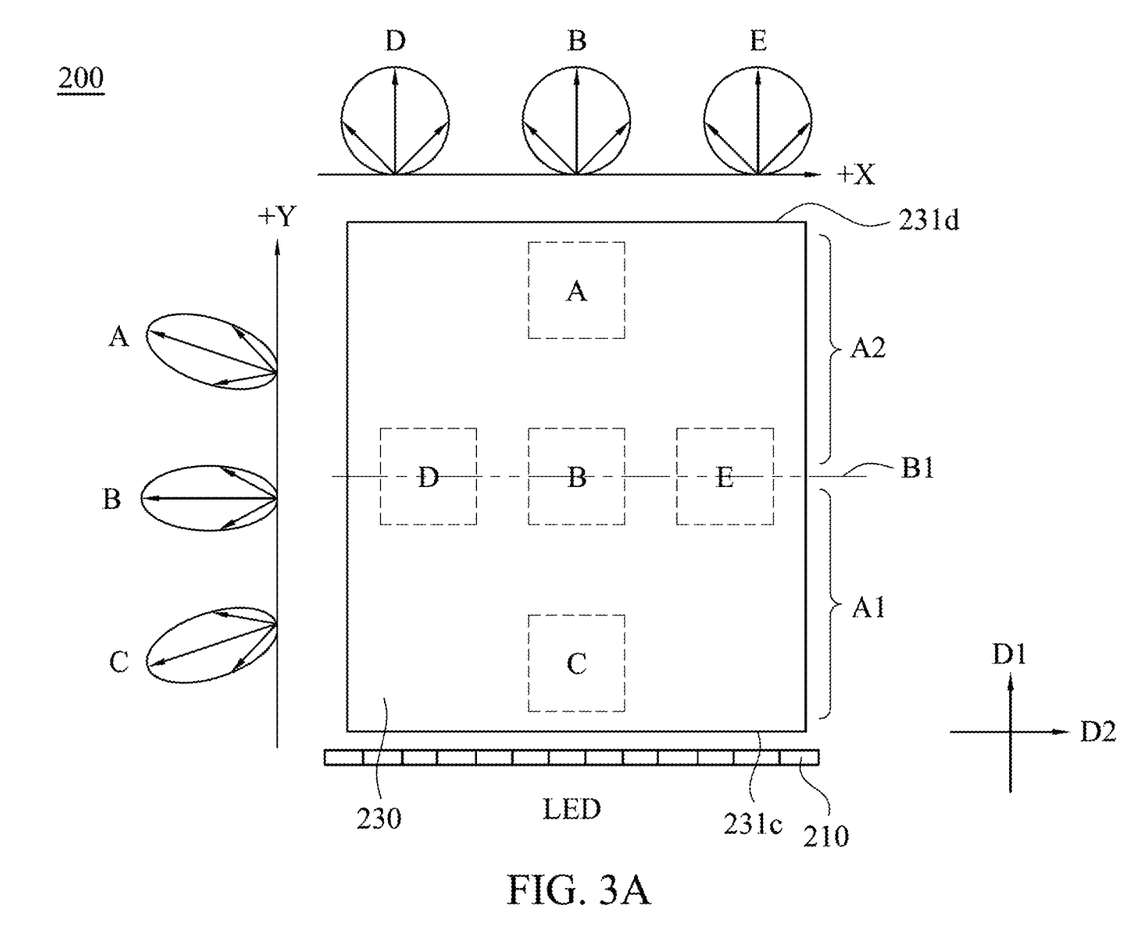
FIG. 3A is a schematic diagram showing light-emitting angles from different zones of the backlight module in accordance with the first embodiment of the present invention.

Simultaneously referring to FIG. 3A, FIG. 3A is a schematic diagram showing light-emitting angles from different zones of the backlight module 200. In the present embodiment, the optical surface 231b of the optical film 230 has a first area A1 and a second area A2. The first area A1 and the second area A2 are arranged along a first direction D1 which extends from the first side surface 231c to the second side surface 231d. The first area A1 is connected to the first side surface 231c, and the second area A2 is connected to the second side surface 231d. The optical structures 232 are arranged in the first area A1 and the second area A2 along the first direction D1. In the present embodiment, each of the optical structures 232 is a stripe structure which extends along a second direction D2, in which the second direction D2 is perpendicular to the first direction D1.

As shown in FIG. 2 and FIG. 3A, in the present embodiment, each of the optical structures 232 has a first surface 232a and a second surface 232b connected to the first surface 232a, in which the first surface 232a is a light-receiving surface which receives light directly. The "light-receiving surface" is defined as the surface which is first contacted by the light beam coming from the light-guiding film 220 and entering the optical film 230. As shown in FIG. 2, the first surface 232a is inclined relative to the optical surface 231b, and there is a first angle α1 between the first surface 232a and the optical surface 231b. Similarly, the second surface 232b is inclined relative to the optical surface 231b, and there is a second angle α2 between the second surface 232b and the optical surface 231b. The first angle α1 and the second angle α2 of each of the optical structures 232 are acute angles. In the present embodiment, the first angles α1 of the optical structures 232 vary along the first direction D1. In the present embodiment, the first angles α1 of the optical structures 232 which are disposed in the first area A1 become greater along the first direction D1, and the first angles α1 of the optical structures 232 which are disposed in the second area A2 become greater along the first direction D1. The optical structures 232 disposed in the first area A1 and the optical structures 232 disposed in the second area A2 are symmetrical in shape about a boundary line B1 between the first area A1 and the second area A2.

Figure 3B:
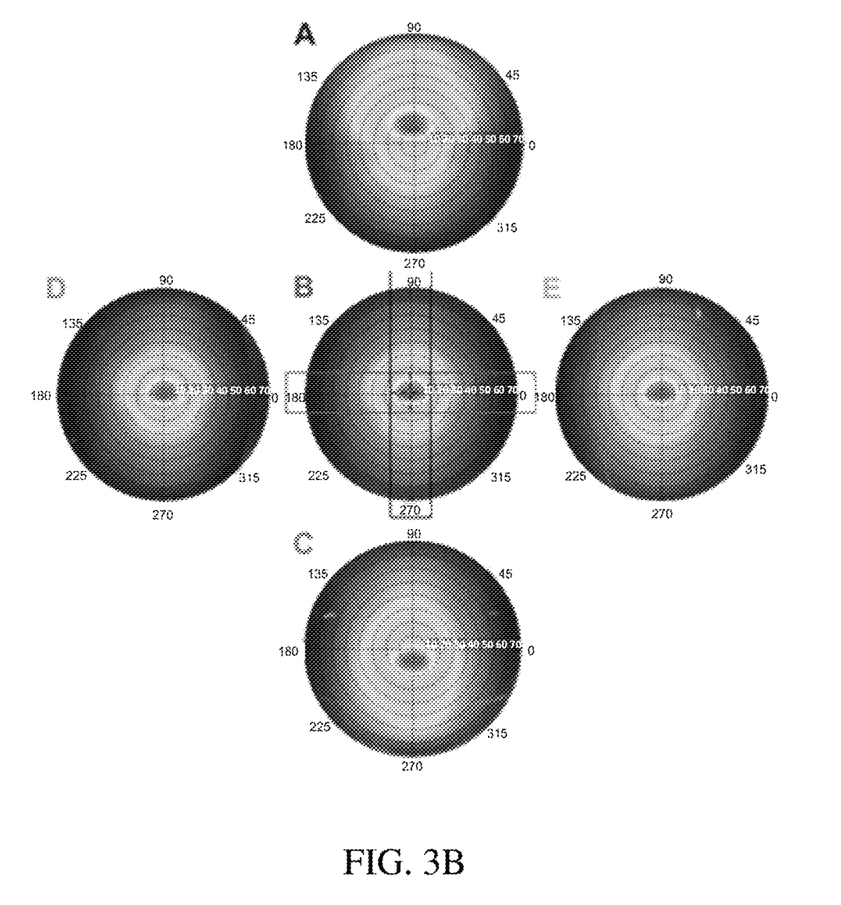
FIG. 3B shows simulation results of viewing angles and light emitting from different zones of the backlight module in accordance with the first embodiment of the present invention.

Referring to FIG. 2 and FIG. 3A, after passing through the light-guiding film 220 and emits outwards from the light-emitting surface 222 of the light-guiding film 220, the light beam provided by the light source 210 may enter the optical film 230 from the first surfaces 232a of the optical structures 232 of the optical film 230, and may further be reflected by the second surfaces 232b of the optical structures 232 to be emitted out of the optical film 230 from the light-emitting surface 231a. More specifically, a light beam L1 deflected by the optical structures 232 located closer to the first side surface 231c can be obliquely emitted outwards from the optical film 230 in −Y direction. A light beam L2 deflected by the optical structures 232 located closer to the side surface 231d can be obliquely emitted outwards from the optical film 230 in +Y direction. A light beam L3 deflected by optical structures 232 which are located in the middle of the optical film 230 can be emitted outwards at an orthogonal viewing angle. Referring to FIG. 3A and FIG. 3B, FIG. 3B shows simulation results of light emitted from different zones of the backlight module in accordance with the first embodiment of the present invention. FIG. 3B shows that a simulation result of zone C located closer to the light source 210 shows the light gray block shifting downwards, meaning that the light energy is concentrated in −Y direction; and that a simulation result of zone A located away from the light source 210 shows that the light gray block shifting upwards, meaning that the light energy is concentrated in the +Y direction. Other simulation results of zones B, D, E located in the middle of the optical film 230 show the light gray blocks remaining in the center, meaning that light passing through those zones can be emitted outwards at orthogonal viewing angles.

Figure 4:
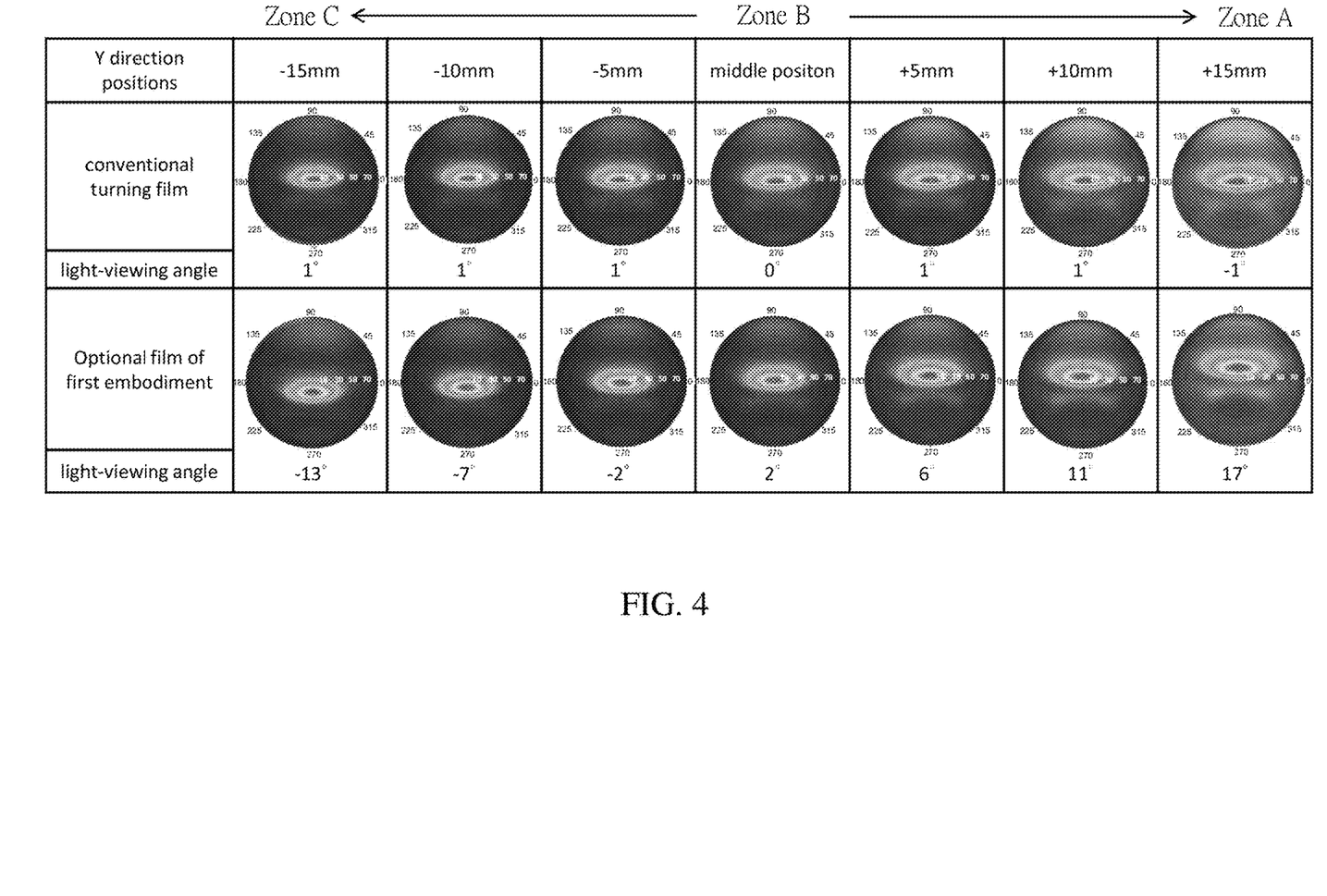
FIG. 4 shows simulation results of viewing angles and light emitting generated by using a conventional turning film and the optical film in accordance with the first embodiment of the present invention.

Referring to FIG. 3A to FIG. 4, FIG. 4 shows simulation results of light emitting generated by using a conventional turning film and the optical film in accordance with the first embodiment of the present invention. As shown in FIG. 4, when the optical film 230 of the first embodiment of the present disclosure is used, the viewing angles of the light beams emitted from a middle area of the backlight module 200 (e.g., zone B) to an area near the light source 210 (e.g., zone C) gradually increase along −Y direction (i.e., downward direction in FIG. 4). Similarly, when the optical film 230 of the first embodiment of the present disclosure is used, the viewing angles of the light beams emitted from a middle area of the backlight module 200 (e.g., zone B) to an area away from the light source 210 (e.g., zone A) gradually increase along +Y direction (i.e., upward direction in FIG. 4). However, while the conventional turning film (for example, the turning film 130 shown in FIG. 1) is used, the viewing angles of the light beams emitted from different zones of the backlight module are about 1 degree. Apparently, the optical film 230 can be used to direct the light beams to be emitted obliquely to form different viewing angles in +Y direction and −Y direction without greatly changing viewing angles or brightness for the areas in X direction. Therefore, when the backlight module 200 of the present disclosure is applied to an automobile display product, an X direction of the backlight module 200 is corresponding to a user's vertical direction (i.e., an up-and-down direction), and a Y direction of the backlight module 200 is corresponding to a user's horizontal direction (i.e., left-and-right direction), thereby enlarging the viewing angle along the horizontal direction without excessively sacrificing the brightness in the vertical direction. In other examples, when the backlight module 200 of the present disclosure is applied to AR or VR display products, the X direction of the backlight module 200 is corresponding to a horizontal direction of viewer's eye-box or exit pupil (i.e., a left-and-right direction), and a Y direction of the backlight module 200 is corresponding to a vertical direction of viewer's eye-box or exit pupil (i.e., up-and-down direction), such that the viewing angle of the backlight module 200 can be enlarged the viewing angle along the vertical direction (the up-and-down direction), and then the light is focused to the viewer's eye-box or exit pupil through lenses.

Figure 5:
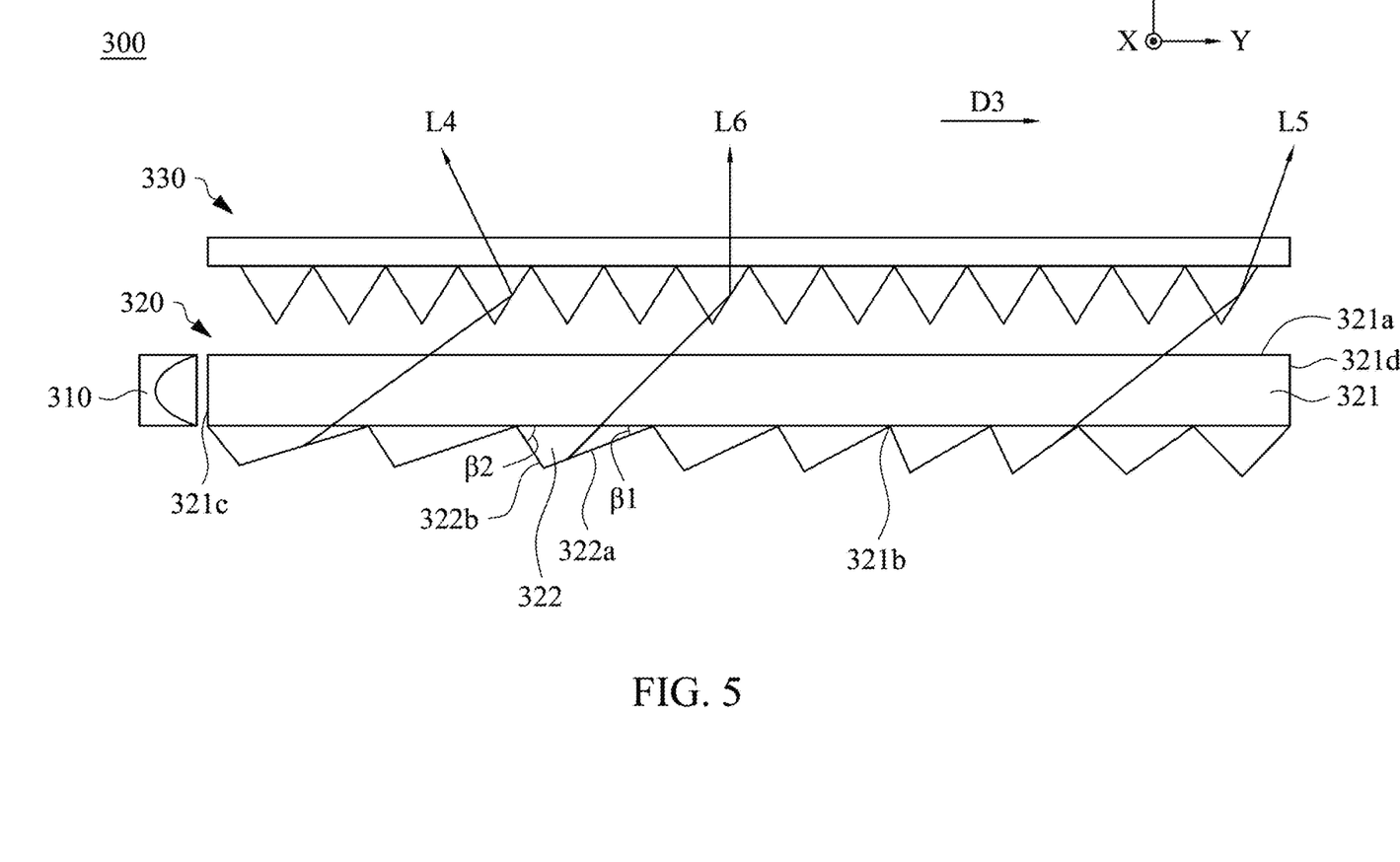
FIG. 5 is a schematic structural diagram showing a backlight module in accordance with a second embodiment of the present invention.

In the present disclosure, the optical film may have different designs. Referring to FIG. 5, FIG. 5 is a schematic structural diagram showing a backlight module 300 in accordance with a second embodiment of the present invention. The backlight module 300 of the present embodiment includes a light source 310, an optical film 320 and a turning film 330. In the present embodiment, the optical film 320 is a light-guiding film which is used as a light guide plate in a side-type backlight module. The optical film 320 mainly includes a main body 321 and plural optical structures 322. The main body 321 has a light-emitting surface 321a, an optical surface 321b, a first side surface 321c and a second side surface 321d. The light-emitting surface 321a of the main body 321 is opposite to the optical surface 321b, and the first side surface 321c and the second side surface 321d are respectively connected to two opposing side edges of the optical surface 321b. The optical structures 322 are disposed on the optical surface 321b of the main body 321. The light source 310 is disposed adjacent to the first side surface 321c of the main body 321, so that after light beam provided by the light source 310 enters the optical film 320, it can be emitted out of the optical film 320 from the light-emitting surface 321a to enter the turning film 330.

As shown in FIG. 5, the optical structures 322 are arranged on the optical surface 321b along a first direction D3 which extends from the first side surface 321c to the second side surface 321d. In one embodiment, each of the optical structures 322 is a stripe structure extends along a second direction perpendicular to the first direction D3. Each of the optical structures 322 has a first surface 322a and a second surface 322b connected to the first surface 322a, in which the first surface 322a is a light-receiving surface. In the present embodiment, the "light-receiving surface" is defined as the surface which is first contacted by the light beam entering the optical film 230. In the present embodiment, the light source 310 is disposed at left side of the optical film 320, so that the light beam provided by the light source 310 travels from the left side to right side of the optical film 320, and therefore the "light-receiving surface" is the first surface 322a. In other embodiments, if the light source 310 is disposed at the right side of the optical film 320, the light beam provided by the light source 310 will travel from the right side to left side of the optical film 320, and therefore the "light-receiving surface" will be the second surface 322b. As shown in FIG. 5, the first surface 322a is inclined relative to the optical surface 321b, and a first angle β1 is formed between the first surface 322a and the optical surface 321b. Similarly, the second surface 322b is inclined relative to the optical surface 321b, and a second angle β2 is formed between the second surface 322b and the optical surface 321b. Both of the first angle β1 and the second angle β2 of each of the optical structures 322 are acute angles. In the present embodiment, the first angles β1 of the optical structures 322 become greater along the first direction D3.

As shown in FIG. 5, the light beam provided by the light source 310 can enter the optical film 320 from the first side surface 321c, and the light beam which enters the optical film 320 is further reflected by the first surfaces 322a of the optical structures 322 and emits outwards from the light-emitting surface 321a of the optical film 320 so as to enter the turning film 330. More specifically, after a light beam L4 deflected by the optical structures 322 which located closer to first side surface 321c enters the turning film 330, it can obliquely be emitted outwards from the turning film 330 in −Y direction. After a light beam L5 deflected by the optical structures 322 located closer to second side surface 321d enters the turning film 330, it can be obliquely emitted outwards from the turning film 330 in +Y direction. After a light beam L6 deflected by the optical structures 322 located in the middle of the optical film 320 enters the turning film 330, it can be emitted outwards at an orthogonal viewing angle. Therefore, by using the optical film 320 of the present disclosure, the backlight module 300 can emit light at viewing angles in +Y direction and −Y direction.

Figure 6:
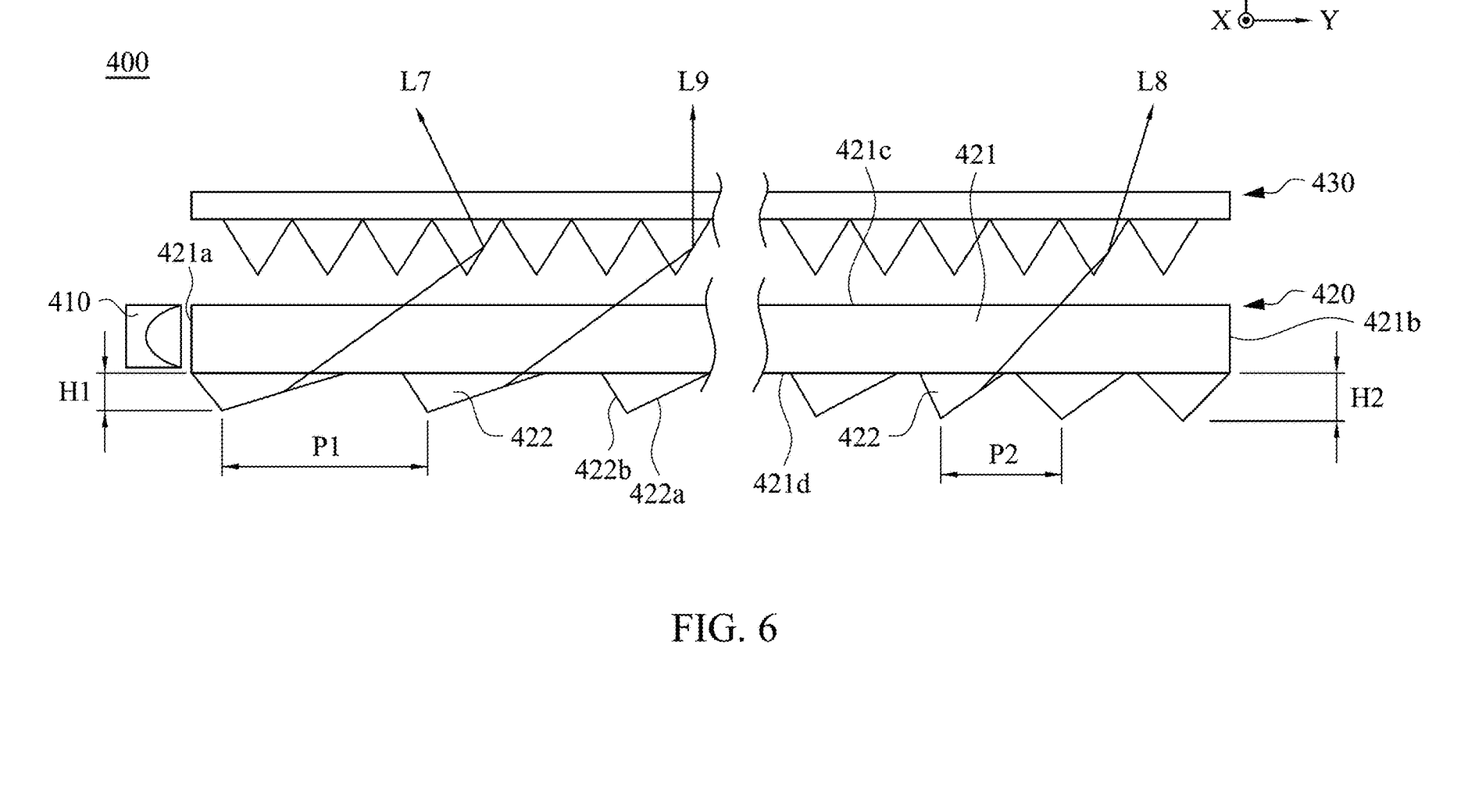
FIG. 6 is a schematic structural diagram showing a backlight module in accordance with a third embodiment of the present invention.

Referring to FIG. 6, FIG. 6 is a schematic structural diagram showing a backlight module 400 in accordance with a third embodiment of the present invention. An optical film 420 of the backlight module 400 of the present disclosure is similar to the optical film 320 shown in FIG. 5, and the main difference therebetween is that optical structures 422 of optical film 420 have different arrangements. As shown in FIG. 6, the backlight module 400 includes a light source 410, an optical film 420 and a turning film 430. The optical film 420 of the present embodiment is a light-guiding film and includes a main body 421 and plural optical structures 422 disposed on the main body 421. The main body 421 has a first side surface 421a, a second side surface 421b, a light-emitting surface 421c and an optical surface 421d, in which the first side surface 421a is a light-incident surface, and the optical structures 422 are disposed on the optical surface 421d. Each of the optical structures 422 has a first surface 422a and a second surface 422b connected to the first surface 422a, and the first surface 422a is a light-receiving surface. In the present embodiment, the first surface 422a is inclined relative to the optical surface 421d, and inclinations of the first surfaces 422a of the optical structures 422 gradually vary along a direction from the first side surface 421a to the second side surface 421b. Therefore, light beam provided by the light source 410 can enter the optical film 420 from the first side surface 421a, and the light beam entering the first side surface 421a is reflected by the first surfaces 422a of the optical structures 422 on the optical film 420 to emit out of the optical film 420 from the light-emitting surface 421c and enter the turning film 430. More specifically, after a light beam L7 deflected by the optical structures 422 located closer to first side surface 421a enters the turning film 430, it can be obliquely emitted outwards from the turning film 430 in −Y direction. After a light beam L8 deflected by the optical structures 422 located closer to second side surface 421b enters the turning film 430, it can be obliquely emitted outwards from the turning film 430 in +Y direction. After a light beam L9 deflected by the optical structures 422 which are located in the middle of the optical film 420 enters the turning film 430, it can be emitted outwards at an orthogonal viewing angle. Therefore, by using the optical film 420 of the present disclosure, the backlight module 300 can emit light at viewing angles in +Y direction and −Y direction.

As shown in FIG. 6, in the present embodiment, a spacing between any two adjacent optical structures 422 decreases with increased distance between the any two adjacent optical structures 422 and the first side surface 421a. In other words, a spacing P2 between every two adjacent optical structures 422 which are located away from the first side surface 421a is smaller than a spacing P1 between every two adjacent optical structures 422 which are located closer to the first side surface 421a. Therefore, by densely arranging the optical structures 422 on a portion of the optical film 420 which is away from the first side surface 421a, the amount of light emitted from the portion of the optical film 420 away from the first side surface 421a and the overall light uniformity of the optical film 420 ca be increased accordingly. In some embodiments, a size or a height of each of the optical structures 422 becomes greater with increased distance from the first side surface 421a. For example, heights H2 of the optical structures 422 which are disposed away from the first side surface 421a are greater than heights H1 of the optical structures 422 which are disposed near the first side surface 421a, thereby increasing amount of light emitted from the portion of the optical film 420 away from the first side surface 421a.

Figure 7:
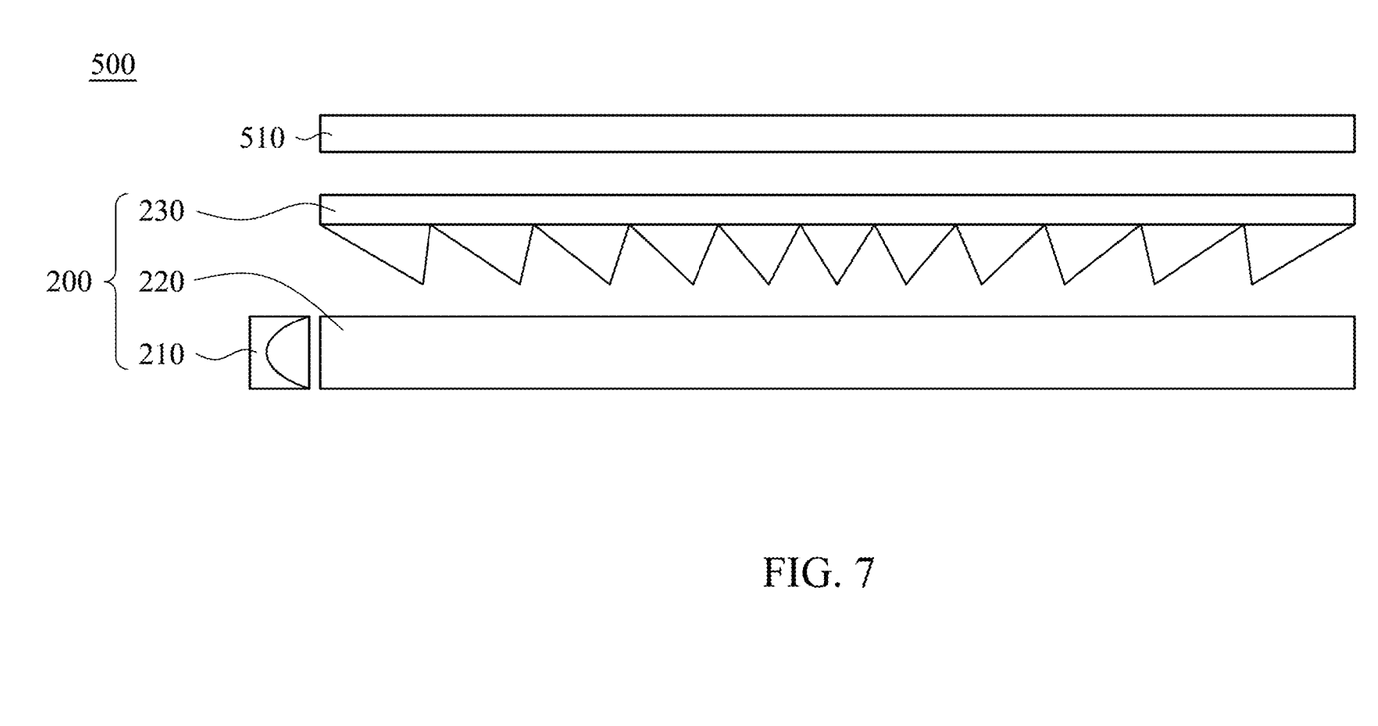
FIG. 7 is a schematic structural diagram showing a display device in accordance with an embodiment of the present invention.

Referring to FIG. 7, FIG. 7 is a schematic structural diagram showing a display device 500 in accordance with an embodiment of the present invention. The display device 500 of the present embodiment includes the backlight module 200 as shown in FIG. 2 and a display panel 510. The display panel 510 is disposed in front of the backlight module 200. Therefore, by applying the backlight module 200 having the optical film 230 to the display device 500 can generate different viewing angles. It is noted that, the backlight module 200 shown in FIG. 2 is merely used as an example which can be applied to the display device 500 for explanation, and embodiments of the present invention are not limited thereto. In other embodiments, other backlight modules, such as the backlight module 300 as shown in FIG. 5, or the backlight module 400 as shown in FIG. 6 also can be applied to a display device, so as to achieve the same effect.

It can be known from the above that the present invention advantageously employs the optical film on which the optical structures having light-receiving surfaces with gradually varying inclinations are disposed to redirect the light beam generated by the light source after passing through the optical film, thereby generating different viewing angles. Thus, the optical film of the present invention is suitable for use in products such as car automobile display devices, or AR/VR display devices. In other words, through the optical film of the present invention, the viewing range of the backlight module can be increased, thereby fully meeting the requirements of different viewing directions from front seats in a car, or near-field reaching distances of AR/VR display devices, thereby satisfying the requirements of various products. Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
  a light-guiding film comprising a light-incident surface and a light-emitting surface connected to the light-incident surface;
  a light source disposed adjacent to the light-incident surface;
  an optical film disposed on the light-guiding film, wherein the light-guiding film is configured to receive and guide a light beam, wherein the optical film is a turning film, and comprises:
    a main body having a light-emitting surface, an optical surface, a first side surface and a second side surface, wherein the light-emitting surface is opposite to the optical surface, and the first side surface and the second side surface are respectively connected to two opposite sides of the optical surface; and
    a plurality of optical structures disposed in a first area of the optical surface, wherein the light beam is guided by the optical structures to emit out from the light-emitting surface, wherein each of the optical structures has:
      a first surface inclined relative to the optical surface, wherein a first angle is formed between the first surface and the optical surface, and wherein the first surface is a light-receiving surface which is first contacted by the light beam coming from the light-guiding film and entering the optical film; and
      a second surface connected to the first surface, wherein the second surface is inclined relative to the optical surface, and a second angle is formed between the second surface and the optical surface;
  wherein the first angles of the optical structures and the second angles of the optical structures are acute angles, and the first angles of the optical structures become greater along a first direction from the first side surface to the second side surface; and
  wherein at a location closer to the first side surface, the light beam is deflected in a direction opposite to the first direction, and at a position closer to the second side surface, the light beam is deflected in a direction, which is the same as the first direction.

2. The backlight module of claim 1, wherein
  the optical surface further comprises a second area, and the optical structures are disposed in the second area, wherein the first area and the second area are arranged along the first direction, and the first area is connected to the first side surface, and the second area is connected to the second side surface; and
  the second angles of the optical structures become smaller along the first direction;
  wherein the optical structures disposed in the first area and the optical structures disposed in the second area are symmetrical in shape about a boundary line between the first area and the second area.

3. The backlight module of claim 1, wherein
  the optical film faces towards the light guide film and is not separated from other components;
  wherein after passing through the light-guiding film and emitting outwards from the light-emitting surface of the light-guiding film, the light beam provided by the light source enters the optical film from the first surfaces of the optical structures and is reflected by the second surfaces to emit out of the optical film from the light-emitting surface.

4. The backlight module of claim 1, wherein the optical structures are arranged along the first direction, and each of the optical structures is a stripe structure which extends along a second direction, and the second direction is perpendicular to the first direction.

5. A display device, comprising:
  a backlight module of claim 1;
  a display panel disposed in front of the backlight module.

6. A backlight module, comprising:
  an optical film, wherein the optical film is a light-guiding film and comprises:
    a main body having a light-emitting surface, an optical surface, a first side surface and a second side surface, wherein the light-emitting surface is opposite to the optical surface, and the first side surface and the second side surface are respectively connected to two opposite sides of the optical surface; and
    a plurality of optical structures disposed in a first area of the optical surface, wherein a light beam is guided by the optical structures to emit out from the light-emitting surface, wherein each of the optical structures has:
      a first surface inclined relative to the optical surface, wherein a first angle is formed between the first surface and the optical surface, and wherein the first surface is a light-receiving surface which is first contacted by the light beam entering the optical film; and
      a second surface connected to the first surface, wherein the second surface is inclined relative to the optical surface, and a second angle is formed between the second surface and the optical surface;
  wherein the first angles of the optical structures and the second angles of the optical structures are acute angles, and the first angles of the optical structures vary along a first direction from the first side surface to the second side surface;
  the first area extends from the first side surface to the second side surface;
  the first angles of the optical structures located in the first area become greater along the first direction;
  a light source disposed adjacent to the first side surface of the optical film; and a turning film disposed on the optical film;

wherein the turning film faces towards the light guide film and has a plurality of prism structures with a length direction;

wherein a length direction of each of the plurality of optical structures is parallel to the length direction of each of the plurality of prism structures; and wherein at a location closer to the first side surface, the light beam is deflected in a direction opposite to the first direction, and at a position closer to the second side surface, the light beam is deflected in a direction, which is the same as the first direction.

7. The backlight module of claim 6, wherein the turning film is not separated from other components;

each of the prism structures has a deflecting surface and a reflecting surface; and wherein the light beam provided by the light source enters the optical film from the first side surface, and the light beam entering the optical film is further reflected by first surfaces of the optical structures to emit out of the optical film from the light-emitting surface and enter the turning film from the deflecting surfaces of the turning film, and the light beam entering the turning film is further reflected by the reflecting surfaces of the turning film to be emit out of the turning film.

8. The backlight module of claim 6, wherein a size or a height of each of the optical structures increases with increased distance between the optical structures and the first side surface.

9. The backlight module of claim 6, wherein a spacing between any two adjacent optical structures decreases with increased distance between the any two adjacent optical structures and the first side surface.

10. The backlight module of claim 6, wherein the optical structures are arranged along the first direction, and each of the optical structures is a stripe structure which extends along a second direction, and the second direction is perpendicular to the first direction.

11. A display device, comprising:

a backlight module of claim 6;

a display panel disposed in front of the backlight module.

* * * * *